Dec. 1, 1936.  N. SCHWARTZ  2,062,834
FILTERING DEVICE OR SEPARATOR FOR FILTER TYPE RESPIRATORS OR THE LIKE

Filed July 6, 1935

INVENTOR.
NATHAN SCHWARTZ

BY

Clark & Ott
ATTORNEYS

Patented Dec. 1, 1936

2,062,834

UNITED STATES PATENT OFFICE 2,062,834

FILTERING DEVICE OR SEPARATOR FOR FILTER TYPE RESPIRATORS OR THE LIKE

Nathan Schwartz, New York, N. Y.

Application July 6, 1935, Serial No. 30,081

1 Claim. (Cl. 183—44)

This invention relates to filtering devices or separators for filter type respirators, gas masks or the like and comprehends an improved device of this character which is so constructed and arranged as to provide a relatively large filtration area for a device of a relatively small size and weight.

More particularly the invention resides in an improved filtering device or separator in which an air chamber is defined between a pair of opposed filter elements and with means which surrounds and spaces said elements apart, which means is formed with an outlet adapted for connection with the interior of the respirator through which the filtered air is drawn from the chamber into the face piece of the respirator thereby making for a structure which, while effectually filtering the air, offers a minimum resistance to breathing.

A further advantage of the present invention is the provision of means for supporting the opposed filter elements which permits of their ready removal and replacement when it is necessary or desirable to change the same.

Other objects in view are to provide a filtering device or separator which employs but few and simple parts, thereby rendering the same economical to produce, without in any way sacrificing the efficiency or safety thereof.

With these objects and others in view, the invention is hereafter specifically described in the following specification, illustrated in the accompanying drawing and pointed out in the appended claim.

Figure 1:
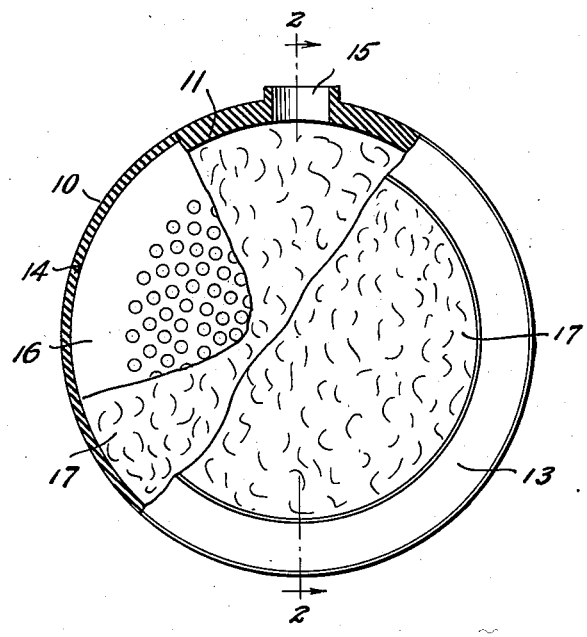
Fig. 1 is a side view of a filtering device or separator for respirators with parts broken away and shown in section to disclose the underlying structure.
Figure 2:
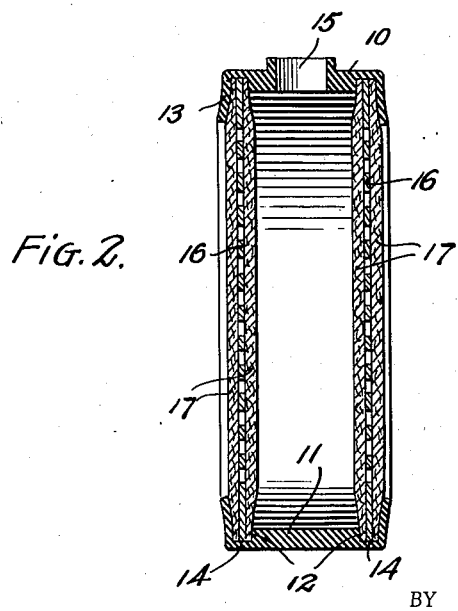
Fig. 2 is a sectional view therethrough taken approximately on the line 2—2 of Fig. 1.

Referring to the drawing by characters of reference, 10 designates an annular wall defining an open ended tubular body which, while shown in the present disclosure, as circular, may within the scope of the invention, be of any other desired configuration wherein the wall is continuous. In practice, the wall or body 10 is preferably constructed of semi-flexible elastic material such as molded rubber with the inner periphery thereof formed intermediate the ends with a continuous or annular boss 11, the side edges 12 of which are spaced from inwardly directed annular flanges 13 which protrude inwardly beyond the inner surface of the boss 11 and which flanges, together with the wall 10, and the side edges 12 of the boss, form a pair of spaced internal grooves 14. Intermediate the grooves, the body is provided with an air outlet 15 which is adapted to communicate with the interior of a respirator.

Filter elements of similar construction are fitted within the grooves 14 whereby they are disposed in spaced relation lying on opposite sides of the outlet 15 to define within the wall or body 10, between said filter elements, an air chamber into which air is drawn through the opposed filter elements and from which the air is withdrawn through the outlet 15 into the face piece or interior of a respirator to which the device is attached. The filter elements may be of any desired type or form which operate to separate from the air drawn therethrough dust, fumes, gases or other harmful substances. As shown, however, the filter elements each includes a perforated or foraminous disc 16 of a relatively rigid material to which is permanently or releasably secured over one or both surfaces thereof, a filtering material 17 such as felt or the like. The filtering element is preferably made of slightly larger diameter or size than the grooved portions 14 of the body or wall 10 so that in emplacing the same the elastic body is slightly expanded and reacts to contract itself in surrounding relation to the filter element to insure the retention of the same in place against accidental or unintentional displacement and to seal the perforations of the filter elements against leakage.

By providing spaced opposed filter elements, a substantial reduction in the resistance to breathing is obtained, while an increased filtration area is provided in a single filtering device or separator. Furthermore, due to the construction of the body or wall 10 the emplacement or removal of the filtering elements is greatly facilitated and a single device of comparatively light weight will be found sufficient for each respirator in lieu of employing a plurality of devices as has heretofore been the practice.

What is claimed is:

A separator for filter type respirators including an annular elastic wall having inwardly directed annular flanges at its opposite ends and an intermediate boss defining a pair of spaced internal grooves with an air outlet between said grooves adapted for communication with the interior of a respirator and a filter element arranged in each groove, located respectively between the opposite sides of the boss and said flanges and removably retained in place by the grooved portions and the flanges to define within said wall between said filter elements an air chamber from which filtered air is drawn through the outlet into the respirator.

NATHAN SCHWARTZ.